United States Patent
Amemiya (10) Patent No.: US 9,855,975 B2
(45) Date of Patent: Jan. 2, 2018

(54) SUSPENSION TOWER AND VEHICLE FRONT STRUCTURE

(71) Applicant: TOYOTA JIDOSHA KABUSHIKI KAISHA, Toyota-shi, Aichi-ken (JP)

(72) Inventor: Koji Amemiya, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/028,177

(22) PCT Filed: Oct. 27, 2014

(86) PCT No.: PCT/IB2014/002231
§ 371 (c)(1),
(2) Date: Apr. 8, 2016

(87) PCT Pub. No.: WO2015/063569
PCT Pub. Date: May 7, 2015

(65) Prior Publication Data
US 2016/0244103 A1 Aug. 25, 2016

(30) Foreign Application Priority Data
Oct. 30, 2013 (JP) .................................. 2013-225813

(51) Int. Cl.
*B62D 21/00* (2006.01)
*B62D 25/08* (2006.01)

(52) U.S. Cl.
CPC ........... *B62D 25/088* (2013.01); *B62D 21/00* (2013.01)

(58) Field of Classification Search
CPC .... B62D 25/088; B62D 25/082; B62D 25/08; B62D 21/00; B62D 21/11
See application file for complete search history.

(56) References Cited

U.S. PATENT DOCUMENTS

| 4,592,934 | A | * | 6/1986 | Wolstoncroft | ........... | C09G 1/12 |
| | | | | | | 106/10 |
| 5,087,074 | A | * | 2/1992 | Komatsu | .................. | B60G 3/20 |
| | | | | | | 180/89.1 |
| 5,456,517 | A | | 10/1995 | Kalian et al. | | |
| 5,536,035 | A | | 7/1996 | Bautz et al. | | |

(Continued)

FOREIGN PATENT DOCUMENTS

| DE | 10 2008 050 297 A1 | 5/2009 |
| DE | 102010039672 A1 | 3/2012 |

(Continued)

OTHER PUBLICATIONS

Aug. 25, 2015 Partial Translation of Office Action issued in Japanese Patent Application No. 2013-225813.

*Primary Examiner* — Gregory Blankenship
(74) *Attorney, Agent, or Firm* — Oliff PLC (57) ABSTRACT

An upper end portion of a shock absorber of a front suspension is fixed to a suspension tower body portion of a suspension tower, and an upper arm of the front suspension is coupled to the suspension tower body portion of the suspension tower. This suspension tower body portion is formed integrally with a side member constituting portion that defines part of a closed cross-sectional shape of a front side member. Thus, in comparison with a configuration in which one or a plurality of combination portions are provided between the suspension tower and the front side member, it is possible to contribute toward more efficiently transmitting a load from the front suspension to the front side member.

6 Claims, 5 Drawing Sheets

(56) References Cited

U.S. PATENT DOCUMENTS

| | | | | |
|---|---|---|---|---|
| 5,897,139 | A * | 4/1999 | Aloe | B60G 7/02 |
| | | | | 280/781 |
| 6,193,273 | B1 * | 2/2001 | Novak | B62D 21/00 |
| | | | | 280/781 |
| 8,727,380 | B2 * | 5/2014 | Akaki | B62D 21/02 |
| | | | | 280/124.109 |
| 8,973,980 | B2 * | 3/2015 | Mildner | B62D 25/088 |
| | | | | 296/192 |
| 2008/0122146 | A1 * | 5/2008 | Herntier | B62D 25/088 |
| | | | | 267/2 |
| 2012/0205944 | A1 * | 8/2012 | Kido | B62D 25/088 |
| | | | | 296/187.09 |
| 2013/0134742 | A1 * | 5/2013 | Mildner | B62D 25/088 |
| | | | | 296/203.02 |
| 2014/0049074 | A1 * | 2/2014 | Lee | B62D 25/088 |
| | | | | 296/203.02 |
| 2015/0084375 | A1 * | 3/2015 | Asano | B62D 21/11 |
| | | | | 296/187.09 |
| 2016/0159399 | A1 * | 6/2016 | Yasuhara | B62D 25/082 |
| | | | | 180/292 |
| 2016/0244103 | A1 * | 8/2016 | Amemiya | B62D 21/00 |
| 2016/0355064 | A1 * | 12/2016 | Amemiya | B62D 25/088 |

FOREIGN PATENT DOCUMENTS

| | | |
|---|---|---|
| JP | H03-40171 U | 4/1991 |
| JP | H06-329050 A | 11/1994 |
| JP | H08-119141 A | 5/1996 |
| JP | 2002-166853 A | 6/2002 |
| JP | 2010-111200 A | 5/2010 |
| WO | 2007/019935 A1 | 2/2007 |
| WO | 2012/163524 A2 | 12/2012 |

* cited by examiner

SUSPENSION TOWER AND VEHICLE FRONT STRUCTURE

BACKGROUND OF THE INVENTION

1. Field of the Invention

The invention relates to a suspension tower that supports a front suspension, and a vehicle front structure.

2. Description of Related Art

In a vehicle body structure described in Japanese Patent Application Publication No. 2010-111200 (JP-2010-111200 A), a damper housing (a suspension tower) that is hung between a side frame (a front side member) and upper and lower members is constituted by a light alloy such as aluminum alloy or the like, with a view to reducing the weight of a vehicle body. Two front and rear brackets made from steel plates are combined with a lower end portion of this damper housing by being fastened by bolts, for the sake of different material combination with the side frame made from a steel plate. Besides, two front and rear bracket assembling portions made from steel plates are combined with an upper portion of the side frame. These bracket assembling portions and the aforementioned front and rear brackets are combined with each other respectively through welding such as spot welding or the like.

In the vehicle body structure as described above, there are combination portions for combining the damper housing with the front and rear brackets, combination portions for combining the front and rear brackets with the front and rear bracket assembling portions, and combination portions for combining the front and rear bracket assembling portions with the side frame, between the damper housing and the side frame. In this manner, there are many combination portions, so there is room for improvement from the standpoint of efficiently transmitting a load input from the front suspension to the damper housing to the side frame.

SUMMARY OF THE INVENTION

The invention obtains a suspension tower and a vehicle front structure that can contribute toward efficiently transmitting a load from a front suspension to a front side member.

A suspension tower according to one aspect of the invention is equipped with a suspension tower body portion and a side member constituting portion. The suspension tower body portion is provided between a front side member of a vehicle and an apron upper member of the vehicle. The suspension tower body portion is fixed to an upper end portion of a shock absorber of a front suspension, and the suspension tower body portion is coupled to an upper arm of the front suspension. The side member constituting portion is formed integrally with the suspension tower body portion. The side member constituting portion defines part of a closed cross-sectional shape of the front side member.

Incidentally, the expression "defining part of the closed cross-sectional shape" means that a closed cross-section is completed in part of the front side member through the provision of the side member constituting portion. In other words, this means that part of the front side member has an open cross-section in a state where the side member constituting portion is not provided.

In the aspect of the invention, the upper end portion of the shock absorber of the front suspension is fixed to the suspension tower body portion, and the upper arm of the front suspension is coupled to the suspension tower body portion. This suspension tower body portion is formed integrally with the side member constituting portion that defines part of the closed cross-sectional shape of the front side member. Thus, in comparison with a configuration in which one or a plurality of combination portions are provided between the suspension tower and the front side member, it is possible to contribute toward more efficiently transmitting a load from the front suspension to the front side member.

In the suspension tower, the front side member may be formed by combining a vehicle-width-direction outer portion of the front side member and a vehicle-width-direction inner portion of the front side member with each other, the suspension tower body portion and the side member constituting portion may be castings, and the side member constituting portion may define part of the vehicle-width-direction outer portion.

In the suspension tower, when a bending load outward in the vehicle width direction is applied to the front side member due to, for example, an offset collision of the vehicle, a tensile load is applied to the vehicle-width-direction inner portion of the front side member, and a compressive load is applied to the vehicle-width-direction outer portion. Part of this vehicle-width-direction outer portion is defined by the side member constituting portion as a casting. In general, however, a plastic material such as a casting is higher in compressive strength than in tensile strength. Therefore, the characteristics of materials can be taken advantage of by using the side member constituting portion as a region of the front side member to which the compressive load is applied as described above. As a result, the front side member can be more efficiently utilized as a collision member.

In the suspension tower, the side member constituting portion may be provided with a rib that extends into the closed cross-sectional shape, the side member constituting portion may have a overlapping region where a position of the side member constituting portion in a vehicle front-rear direction and a position of the suspension tower body portion in the vehicle front-rear direction overlap with each other as viewed in the vehicle width direction, and the overlapping region of the side member constituting portion may be provided with the rib.

In the suspension tower, the aforementioned rib reinforces the closed cross-sectional shape of the front side member in the region where the position of the side member constituting portion in the vehicle front-rear direction and the position of the suspension tower body portion in the vehicle front-rear direction overlap with each other as viewed in the vehicle width direction. Thus, the rigidity of the aforementioned closed cross-sectional shape in response to a load transmitted from the front suspension to the front side member via the suspension tower body portion can be enhanced. As a result, it is possible to further contribute to the effect of efficiently transmitting (distributing) the load from the front suspension to the front side member.

In the suspension tower, the side member constituting portion may be provided with a pair of the ribs that are adjacent to each other in the vehicle front-rear direction, a sub-frame mounting portion may be provided between the pair of the ribs, the sub-frame mounting portion may be mounted with a sub-frame, and the sub-frame may be disposed downward in a vehicle up and down direction with respect to the front side member.

In the suspension tower, the sub-frame mounting portion is provided between the pair of the ribs that are adjacent to each other in the vehicle front-rear direction in the region where the position of the side member constituting portion in the vehicle front-rear direction and the position of the suspension tower body portion in the vehicle front-rear direction overlap with each other as viewed in the vehicle width direction. Thus, the sub-frame mounting portion can be reinforced by the pair of the ribs, so it is possible to contribute toward efficiently transmitting (distributing) the load from the front suspension to the sub-frame.

In the suspension tower, a surface of the rib may be provided on a same plane as a surface of one wall portion with which the suspension tower body portion is equipped.

In the suspension tower, the load received from the front suspension by the suspension tower body portion can be linearly transmitted to the rib of the side member constituting portion via the wall portion of the suspension tower body portion. Thus, it is possible to further contribute toward efficiently transmitting the load from the front suspension to the front side member.

The suspension tower may be further equipped with a lower arm coupling portion that is formed integrally with the suspension tower body portion and the side member constituting portion. A lower arm of the front suspension may be coupled to the lower arm coupling portion.

In the suspension tower, the lower arm coupling portion to which the lower arm of the front suspension is coupled is formed integrally with the suspension tower body portion and the side member constituting portion (part of the closed cross-sectional shape of the front side member). Therefore, in comparison with a case where the lower arm coupling portion is formed separately from the suspension tower body portion and the front side member, it is possible to contribute toward more efficiently transmitting the load from the front suspension to the front side member.

In the suspension tower, a continuous wall may extend through the suspension tower body portion and the side member constituting portion.

In the suspension tower, the suspension tower body portion can efficiently transmit the load received from the front suspension by the suspension tower body portion to the side member constituting portion via the continuous wall that extends as described above. Thus, it is possible to further contribute toward enhancing the efficiency of transmitting the load to the front side member.

A suspension tower is equipped with a suspension tower body portion, a side member combining portion, and a lower arm coupling portion. The suspension tower body portion is provided between a front side member of a vehicle and an apron upper member of the vehicle. The suspension tower body portion is fixed to an upper end portion of a shock absorber of a front suspension, and the suspension tower body portion is coupled to an upper arm of the front suspension. The side member combining portion is formed integrally with the suspension tower body portion and the side member combining portion is combined with the front side member. The lower arm coupling portion is formed integrally with the suspension tower body portion and the side member combining portion. The lower arm coupling portion is coupled to A lower arm of the front suspension.

In the invention, the suspension tower body portion to which the shock absorber is fixed and to which the upper arm is coupled, and the lower arm coupling portion to which the lower arm is coupled are formed integrally with the side member combining portion that is combined with the front side member. Thus, the number of combination portions between the suspension tower body portion and the lower arm coupling portion on the one hand and the front side member on the other hand can be reduced. Therefore, it is possible to contribute toward efficiently transmitting the load from the front suspension to the front side member.

A vehicle front structure is equipped with the front side member, the apron upper member, the front suspension, and the suspension tower at both right and left side portions of a vehicle front portion respectively.

The vehicle front structure is constituted as described above, and hence exerts an operation and an effect as described above.

As described above, the suspension tower and the vehicle front structure according to the invention can contribute toward efficiently transmitting the load from the front suspension to the front side member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

A suspension tower 10 and a vehicle front structure 12 according to the first embodiment of the invention will be described based on FIGS. 1 to 4. Incidentally, arrows FR, UP and IN depicted in the respective drawings as appropriate indicate a forward direction (a traveling direction) of a vehicle, an upward direction, and an inside of a vehicle width direction respectively. Hereinafter, when a front-rear direction, a lateral direction, and a up and down direction are simply used for explanation, the front-rear direction with respect to the vehicle, the lateral direction with respect to the vehicle (the vehicle width direction), and the vehicle up and down direction are meant respectively, unless otherwise specified.

Figure 1:
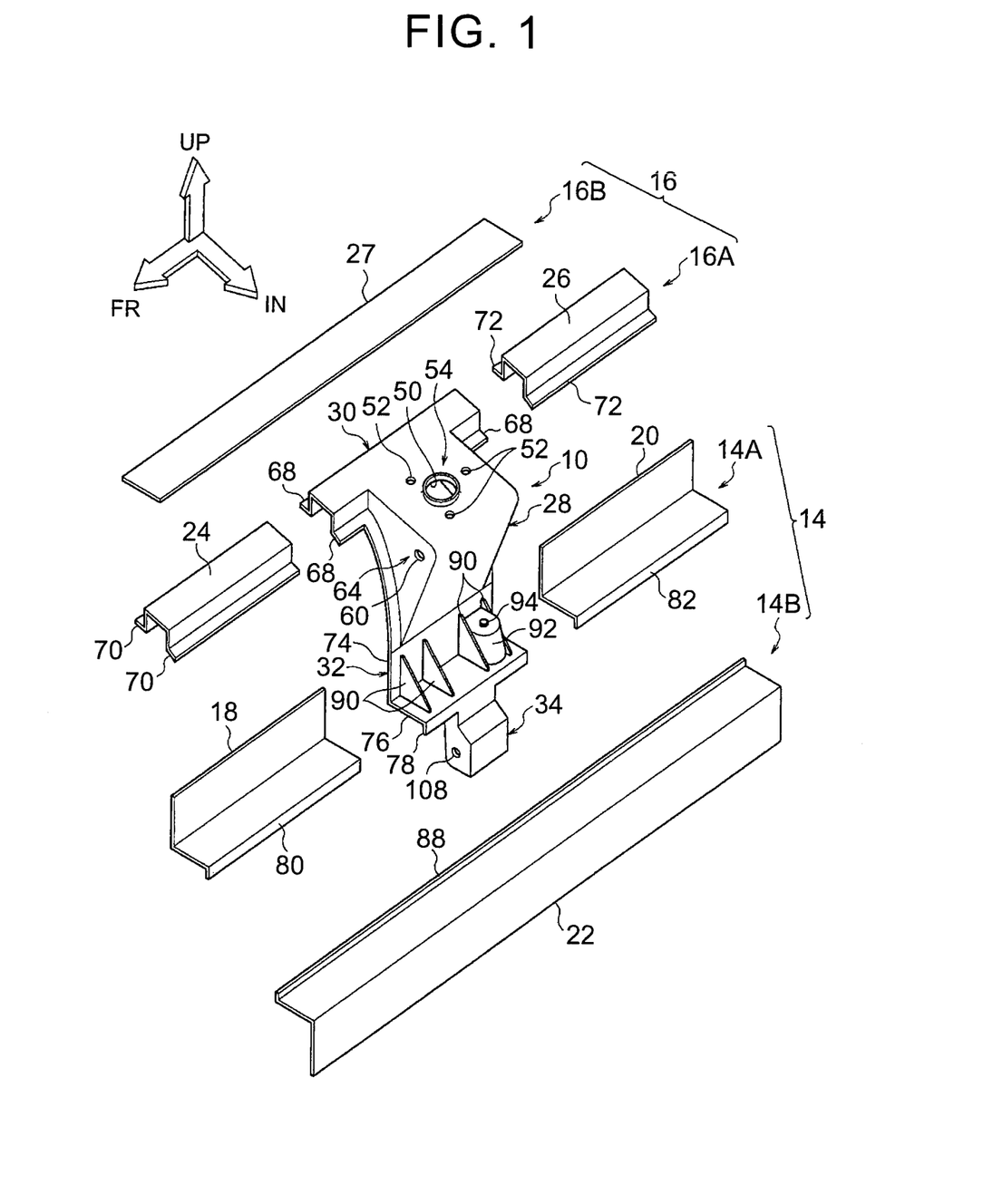
FIG. 1 is an exploded perspective view of a vehicle front structure according to the first embodiment of the invention.
Figure 2:
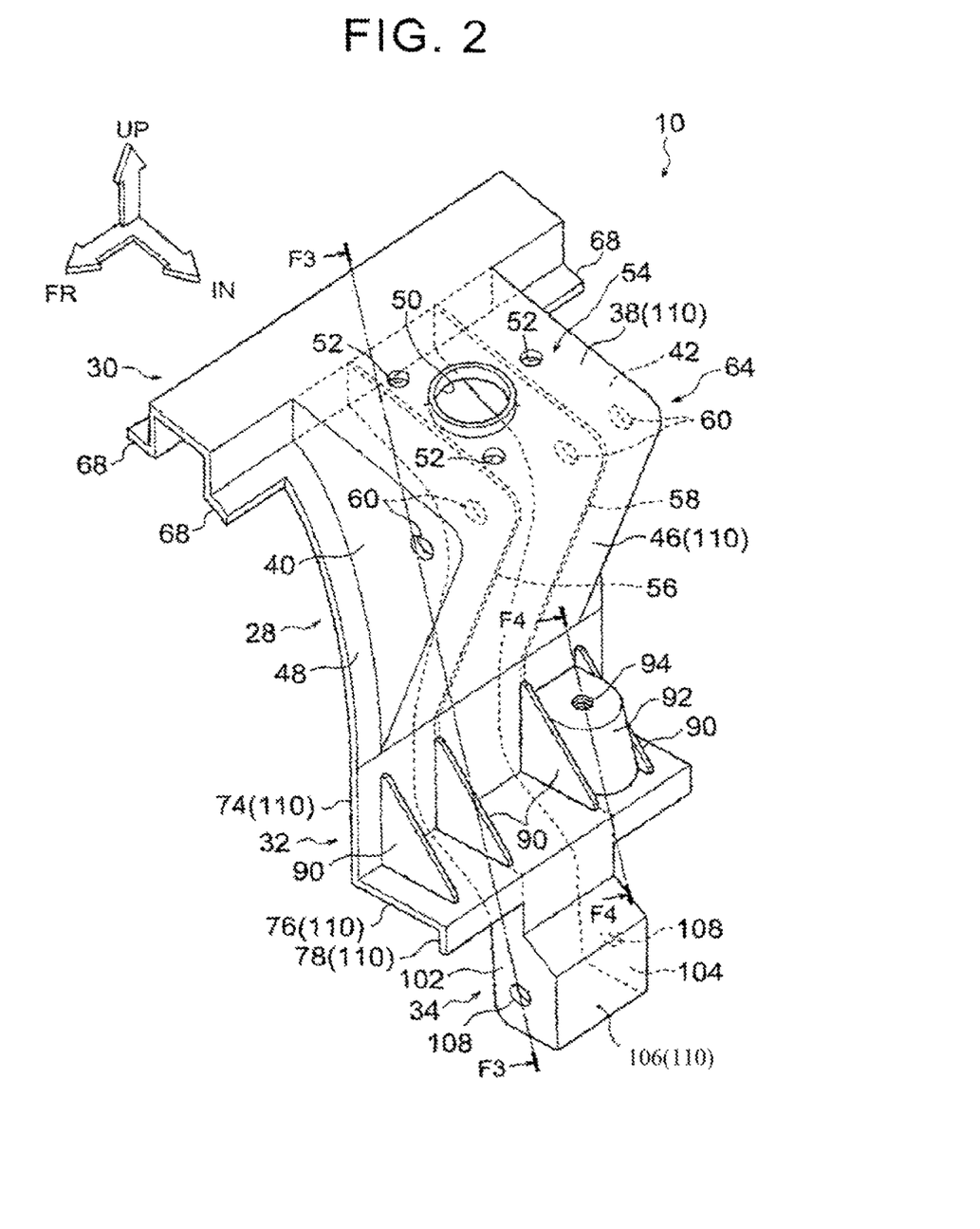
FIG. 2 is a perspective view of a suspension tower shown in FIG. 1.

(Configuration) As shown in FIG. 1, the vehicle front structure 12 according to the present embodiment of the invention is applied to, for example, a sedan vehicle, and is equipped with a front side member 14, an apron upper member 16, and a suspension tower 10. Besides, this vehicle front structure 12 is equipped with a front suspension 36 that is partially shown in FIG. 3. Incidentally, these components are provided at both right and left side portions of a vehicle front portion respectively, but are basically identical in configuration to each other except in that they are laterally symmetrically formed. Therefore, the configuration of the right side of the vehicle will be described, and the configuration of the left side of the vehicle will not be described.

The front side member 14 is a skeleton member of a vehicle body that extends along the vehicle front-rear direction at either side portion of the vehicle front portion. This front side member 14 is formed by combining a vehicle-width-direction outer portion 14A and a vehicle-width-direction inner portion 14B with each other, and assumes a rectangular closed cross-sectional shape as viewed from the vehicle front-rear direction. The vehicle-width-direction outer portion 14A is constituted of a pair of front and rear outer panels 18 and 20 as press-molded products made from steel plates, and a side member constituting portion 32 as part of the suspension tower 10. Besides, the vehicle-width-direction inner portion 14B is constituted by an inner panel 22 as a press-molded product made from a steel plate. A bumper reinforcement (not shown) is coupled to a front end portion of this front side member 14.

The apron upper member 16 is a skeleton member of the vehicle body that extends along the vehicle front-rear direction, the skeleton member of the vehicle body being upward in a vehicle up and down direction with respect to the front side member 14 and, the skeleton member of the vehicle body being outside the front side member 14 in the vehicle width direction. This apron upper member 16 is formed by combining an upper portion 16A and a lower portion 16B with each other. The upper portion 16A is constituted of a pair of front and rear upper panels 24 and 26 as press-molded products made from steel plates, and an upper member constituting portion 30 as part of the suspension tower 10. The lower portion 16B is constituted by a lower panel 27 as a press-molded product made from a steel plate. This apron upper member 16 assumes a rectangular closed cross-sectional shape as viewed from the vehicle front-rear direction, and is provided between a front pillar (not shown) and a radiator support (not shown). Incidentally, in FIG. 1, the outer panels 18 and 20, the inner panel 22, the upper panels 24 and 26, and the lower panel 27 are schematically depicted.

On the other hand, as shown in FIGS. 1 to 4, the suspension tower 10 is an integrally formed product that is obtained by forming a suspension tower body portion 28, the foregoing upper member constituting portion 30, the foregoing side member constituting portion 32, and a lower arm coupling portion 34 integrally with one another. This suspension tower 10 is, for example, a member for coupling a double wish bone-type front suspension 36 (which is only partially shown in FIG. 3) to the vehicle body, and is a casting made of a light metal such as aluminum or the like in the present embodiment of the invention.

The suspension tower body portion 28 is provided between the front side member 14 and the apron upper member 16. This suspension tower body portion 28 is integrally equipped with an upper wall 38, a front wall 40, a rear wall 42, and a vehicle-width-direction inner wall 46. This suspension tower body portion 28 is configured to cover an upper portion of the front suspension 36 from inside of the vehicle.

The upper wall 38 is rectangularly formed in a plan view, with the thickness direction thereof extending substantially along the vehicle up and down direction. The front wall 40 extends downward in the vehicle up and down direction from a front end portion of the upper wall 38, and the rear wall 42 extends downward in the vehicle up and down direction from a rear end portion of the upper wall 38. Besides, the vehicle-width-direction inner wall 46 extends downward in the vehicle up and down direction from a vehicle-width-direction inner end portion of the upper wall 38, and the front wall 40 and the rear wall 42 are coupled to each other in the vehicle front-rear direction by the vehicle-width-direction inner wall 46.

Incidentally, a flange portion 48 extends forward in the vehicle front-rear direction from a vehicle-width-direction outer end portion of the front wall 40. Besides, a flange portion (not shown) extends rearward in the vehicle front-rear direction from a vehicle-width-direction outer end portion of the rear wall 42. A front panel portion and a rear panel portion, which constitute a front fender apron, are constituted to be combined with these flange portions respectively.

A circular through-hole 50 is formed through a central portion of the upper wall 38 of the aforementioned suspension tower body portion 28, in a region opposed to an upper end portion of a shock absorber (not shown) with which the front suspension 36 is equipped. A hole edge portion of this through-hole 50 is bent upward in the vehicle up and down direction. Incidentally, a spring (not shown) is fitted to the aforementioned shock absorber.

A plurality of (three in this case) absorber mounting holes 52 into which a plurality of (three in this case) bolts (not shown) provided at the upper end portion of the shock absorber are inserted are formed around the through-hole 50 of the upper wall 38. These absorber mounting holes 52 are arranged at equal intervals or at substantially equal intervals in the circumferential direction of the through-hole 50, and nuts are screwed onto the bolts inserted in these absorber mounting holes 52 respectively. Thus, the upper end portion of the shock absorber is fastened and fixed to the upper wall 38 of the suspension tower body portion 28. The periphery of the plurality of the absorber mounting holes 52 on this upper wall 38 is an absorber mounting portion 54.

Besides, with this suspension tower body portion 28, a pair of front and rear rib-like walls 56 and 58 that are formed in the shape of a rib are provided between the front wall 40 and the rear wall 42. These rib-like walls 56 and 58 extend outward in the vehicle width direction from a lower face of the upper wall 38 and a vehicle-width-direction outer face of the vehicle-width-direction inner wall 46. As is the case with the front wall 40 and the rear wall 42, the thickness direction of the rib-like walls 56 and 58 coincides with the vehicle front-rear direction. The front wall 40, the rear wall 42, and the pair of the front and rear rib-like walls 56 and 58 are arranged apart from one another in the vehicle front-rear direction.

Circular upper arm mounting holes 60 that penetrate in the vehicle front-rear direction are formed through the front wall 40, the rear wall 42, and the pair of the front and rear rib-like walls 56 and 58 respectively. Shafts (not shown) that penetrate a vehicle-width-direction inner end portion of an upper arm 62 (see FIG. 3) of the front suspension 36 are inserted through these upper arm mounting holes 60 respectively, and nuts are screwed onto external thread portions that are formed at both axial end portions of the shafts respectively. Thus, the vehicle-width-direction inner end portion of the upper arm 62 is rotatably coupled to the suspension tower body portion 28. At this suspension tower body portion 28, the periphery of a plurality of the upper arm mounting holes 60 is an upper arm coupling portion 64.

On the other hand, the upper member constituting portion 30 integrally extends outward in the vehicle width direction from the upper end portion of the suspension tower body portion 28. The dimension of this upper member constituting portion 30 along the vehicle front-rear direction is set longer than the dimension of the suspension tower body portion 28 along the vehicle front-rear direction. The upper member constituting portion 30 protrudes forward and rearward of the suspension tower body portion 28. This upper member constituting portion 30 is formed with a hat-like cross-section that is open downward in the vehicle up and down direction as viewed from the vehicle front-rear direction, and has a pair of right and left flange portions 68.

A rear end portion of the front upper panel 24, which is one of the foregoing pair of the front and rear upper panels 24 and 26, is superimposed on and combined with a front end portion of this upper member constituting portion 30. Besides, a front end portion of the rear upper panel 26 is superimposed on and combined with a rear end portion of the upper member constituting portion 30. Thus, the upper portion 16A of the apron upper member 16 is formed. Incidentally, means such as riveting, fastening by bolts, friction stir welding or the like can be used to combine the upper panels 24 and 26 with the upper member constituting portion 30.

As is the case with the upper member constituting portion 30, the aforementioned upper panels 24 and 26 are formed with a hat-like cross-section as viewed from the vehicle front-rear direction, and have a pair of right and left flange portions 70 and 72 that continue to the pair of the right and left flange portions 68, respectively. Then, a flat plate-like lower panel 27 that constitutes the lower portion 16B of the apron upper member 16 is superimposed on lower faces of the aforementioned respective flange portions 68, 70 and 72. This lower panel 27 is combined with the flange portions 70 and 72 through the use of means such as spot welding or the like, and is combined with the flange portion 68 through the use of means such as riveting, fastening by bolts, friction stir welding or the like. Thus, the apron upper member 16 that assumes a rectangular closed cross-sectional shape is formed, and the upper member constituting portion 30 constitutes part of the closed cross-sectional shape of the apron upper member 16.

Figure 3:
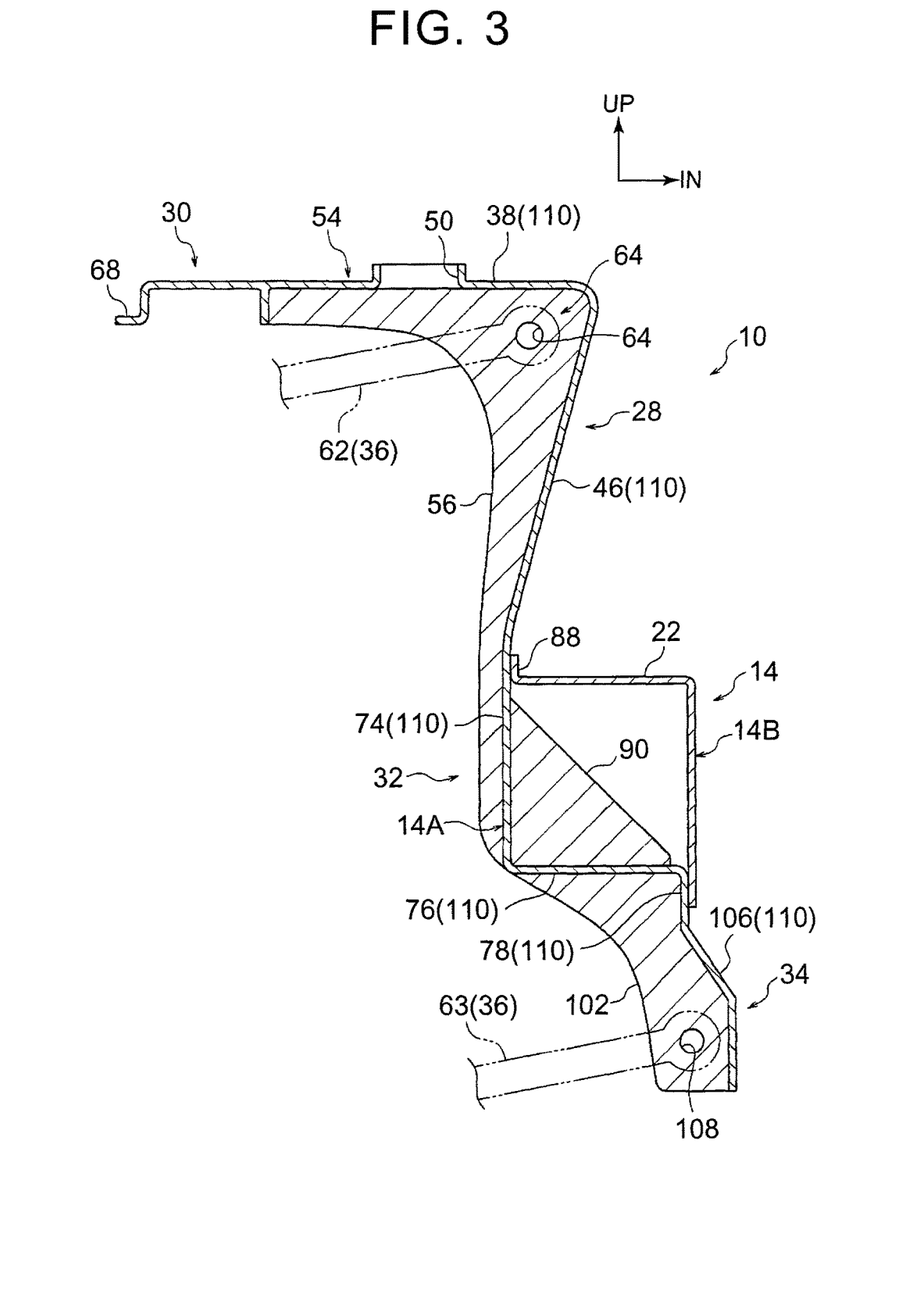
FIG. 3 is an enlarged cross-sectional view showing, on an enlarged scale, a cross-section along a line F3-F3 of FIG. 2.
Figure 4:
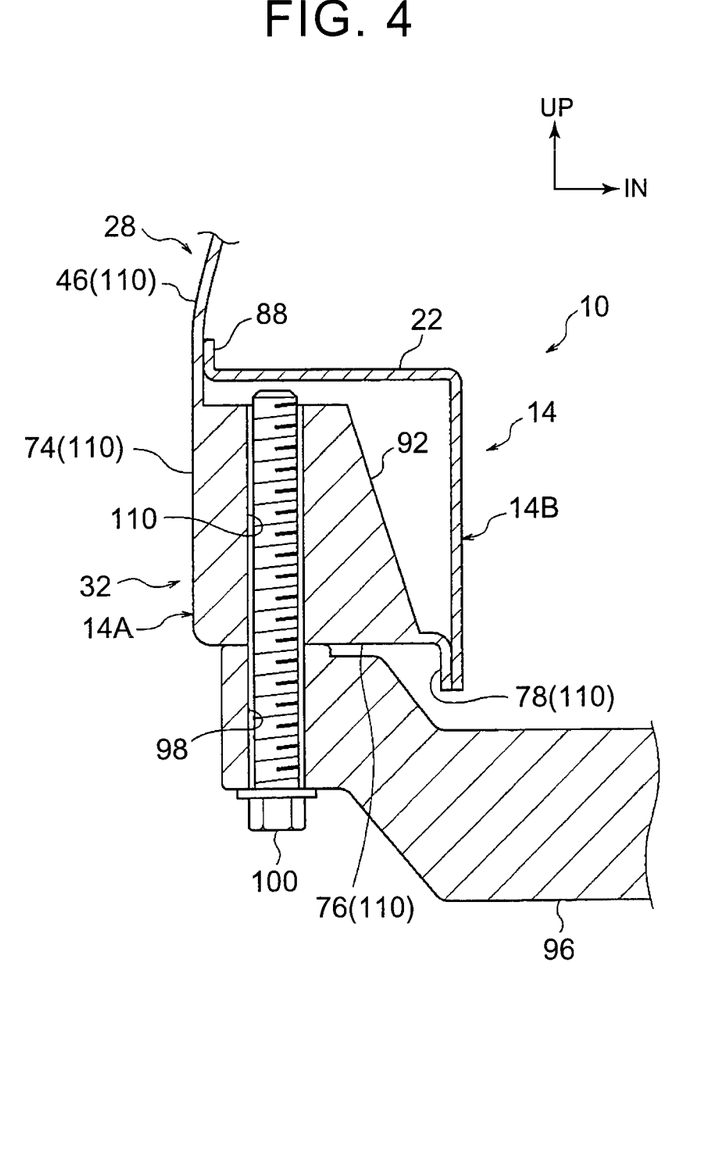
FIG. 4 is an enlarged cross-sectional view showing, on an enlarged scale, a cross-section along a line F4-F4 of FIG. 2.

On the other hand, the side member constituting portion 32 is equipped with a vehicle-width-direction outer wall 74 that integrally extends downward in the vehicle up and down direction from the lower end portion of the suspension tower body portion 28, and a lower wall 76 that extends inward in the vehicle width direction from a lower end of the vehicle-width-direction outer wall 74. Besides, a flange portion 78 extends downward in the vehicle up and down direction from a vehicle-width-direction inner end portion of this lower wall 76, and the side member constituting portion 32 is formed with a substantially L-shaped (substantially crank-like) cross-section as viewed from ahead of the vehicle, as shown in FIG. 3.

A rear end portion of the front outer panel 18, which is one of the foregoing pair of the front and rear outer panels 18 and 20, is superimposed on and combined with a front end portion of this side member constituting portion 32. Besides, a front end portion of the rear outer panel 20 is superimposed on and combined with a rear end portion of the side member constituting portion 32. Thus, the vehicle-width-direction outer portion 14A of the front side member 14 is formed. Incidentally, means such as riveting, fastening by bolts, friction stir welding or the like can be used to combine the outer panels 18 and 20 with the side member constituting portion 32.

As with the case with the side member constituting portion 32, the aforementioned outer panels 18 and 20 are formed with a substantially L-shaped cross-section as viewed from ahead of the vehicle, and have flange portions 80 and 82 that continue to the flange portion 78, respectively. Then, a lower end portion of the inner panel 22 that constitutes the vehicle-width-direction inner portion 14B of the front side member 14 is superimposed on the aforementioned respective flange portions 78, 80 and 82, from inside in the vehicle width direction. The lower end portion of this inner panel 22 is combined with the flange portions 80 and 82 through the use of means such as spot welding or the like, and is combined with the flange portion 78 through the use of means such as riveting, fastening by bolts, friction stir welding or the like.

This inner panel 22 is formed with a substantially inverse L-shaped cross-section (a substantially crank-like cross-section) as viewed from ahead of the vehicle, and a flange portion 88 that is provided at a vehicle-width-direction outer end portion of the upper end portion of the inner panel 22 is superimposed on the upper end portions of the outer panels 18 and 20 and the upper end portion of the vehicle-width-direction outer wall 74 from inside in the vehicle width direction. This flange portion 88 is combined with the upper end portions of the outer panels 18 and 20 through the use of means such as spot welding or the like, and is combined with the upper end portion of the vehicle-width-direction outer wall 74 of the side member constituting portion 32 through the use of means such as riveting, fastening by bolts, friction stir welding or the like. Thus, the front side member 14 that assumes a closed cross-sectional shape is formed, and the side member constituting portion 32 constitutes part of the closed cross-sectional shape of the front side member 14 (part of the vehicle-width-direction outer portion 14A).

The dimension of this side member constituting portion 32 in the vehicle front-rear direction is set equal to the dimension of the suspension tower body portion 28 in the vehicle front-rear direction. Then, a plurality of (four in this case) ribs 90 that extend into the closed cross-sectional shape of the front side member 14 are provided side by side in the vehicle front-rear direction on this side member constituting portion 32, in a overlapping region where the position in the vehicle front-rear direction overlaps with the suspension tower body portion 28. The side member constituting portion 32 has a overlapping region where the position of the side member constituting portion 32 in the vehicle front-rear direction and the position of the suspension tower body portion 28 in the vehicle front-rear direction overlap with each other as viewed in the vehicle width direction, and the ribs 90 are provided in the overlapping region of the side member constituting portion 32.

The plurality of these ribs 90 are formed in the shape of a right triangle as viewed from the vehicle front-rear direction, and are diagonally provided between the vehicle-width-direction outer wall 74 and the lower wall 76. A surface of the frontmost rib 90 is provided on the same plane as a surface of the front wall 40 of the suspension tower body portion 28, and a surface of the second-from-front rib 90 is provided on the same plane as a surface of the front rib-like wall 56. Besides, a surface of the third-from-front rib 90 is provided on the same plane as a surface of the rear rib-like wall 58, and the rearmost rib 90 is provided on the same plane as the rear wall 42. Thus, the plurality of the ribs 90 are arranged apart from one another in the vehicle front-rear direction.

A sub-frame mounting portion 92 is provided in a sandwiched state between the third-from-front rib 90 and the rearmost rib 90 (between a pair of the ribs that are adjacent to each other in the vehicle front-rear direction). This sub-frame mounting portion 92 is formed integrally with the third-from-front rib 90, the rearmost rib 90, the vehicle-width-direction outer wall 74, and the lower wall 76, and protrudes into the closed cross-sectional shape of the front side member 14 in a trapezoidal cross-sectional shape. A bolt hole 94 that penetrates in the vehicle up and down direction is formed through this sub-frame mounting portion 92. An internal thread is formed in an inner periphery of this bolt hole 94.

The aforementioned sub-frame mounting portion 92 corresponds to a sub-frame 96 (see FIG. 4) that is provided downward in a vehicle up and down direction with respect to the front side member 14. The sub-frame 96 is a skeleton member of the vehicle body, and is disposed between the right and left front side members 14. An insertion hole 98 that penetrates in the vehicle up and down direction is formed at a vehicle-width-direction end portion of this sub-frame 96. A bolt 100 is inserted through this insertion hole 98 from downward in the vehicle up and down direction. The bolt 100 is screwed into the internal thread of the bolt hole 94, so the sub-frame 96 is fastened and fixed to the sub-frame mounting portion 92.

On the other hand, the lower arm coupling portion 34 extends downward in the vehicle up and down direction from a vehicle front-rear direction central portion at a lower end of the side member constituting portion 32. The dimension of the lower arm coupling portion 34 in the vehicle front-rear direction is set smaller than the dimension of the side member constituting portion 32 in the vehicle front-rear direction. This lower arm coupling portion 34 is equipped with a front wall 102 and a rear wall 104 that extend downward in the vehicle up and down direction from the lower wall 76 of the side member constituting portion 32. Besides, this lower arm coupling portion 34 is equipped with a vehicle-width-direction inner wall 106 that couples vehicle-width-direction inner end portions of the front wall 102 and the rear wall 104 to each other in the vehicle front-rear direction, and is formed with a substantially U-shaped cross-section that is open outside in the vehicle width direction as viewed from the vehicle up and down direction.

The front wall 102 is provided on the same plane as the front rib-like wall 56 of the suspension tower body portion 28 and a surface of the second-from-front rib 90 of the side member constituting portion 32. Besides, the rear wall 104 is provided on the same plane as the rear rib-like wall 58 of the suspension tower body portion 28 and a surface of the third-from-front rib 90 of the side member constituting portion 32. Besides, an upper portion of the vehicle-width-direction inner wall 106 is inclined outward in the vehicle width direction as the upper portion of the vehicle-width-direction inner wall 106 extends upward in the vehicle up and down direction, and is integrally connected to the flange portion 78 of the side member constituting portion 32.

Circular lower arm mounting holes 108 that penetrate in the vehicle front-rear direction are formed through the front wall 102 and the rear wall 104 respectively. Shafts (not shown) that penetrate a vehicle-width-direction inner end portion of the lower arm 63 (see FIG. 3) of the front suspension 36 are inserted through these lower arm mounting holes 108 respectively, and nuts are screwed onto external thread portions that are formed at both axial end portions of the shafts respectively. Thus, the vehicle-width-direction inner end portion of the lower arm 63 is rotatably coupled to the lower arm coupling portion 34.

As shown in FIG. 3, the suspension tower 10 configured as described above has a continuous wall 110 that extends through the suspension tower body portion 28, the side member constituting portion 32, and the lower arm coupling portion 34. This continuous wall 110 is constituted of the upper wall 38 and the vehicle-width-direction inner wall 46 of the suspension tower body portion 28, the vehicle-width-direction outer wall 74, the lower wall 76, and the flange portion 78 of the side member constituting portion 32, and the vehicle-width-direction inner wall 106 of the lower arm coupling portion 34.

(Operation and Effect) Next, an operation and an effect of this first embodiment of the invention will be described.

In this first embodiment of the invention, the upper end portion of the shock absorber of the front suspension 36 is fixed to the suspension tower body portion 28, and the upper arm 62 of the front suspension 36 is coupled to the suspension tower body portion 28. Therefore, a load is input to this suspension tower body portion 28 from the front suspension 36 when the vehicle runs.

It should be noted herein that the aforementioned suspension tower body portion 28 is formed integrally with the side member constituting portion 32 that constitutes part of the closed cross-sectional shape of the front side member 14. Thus, in comparison with a configuration in which one or a plurality of combination portions are provided between a suspension tower and a front side member, it is possible to contribute toward more efficiently transmitting the load from the front suspension 36 to the front side member 14.

As a result, the load from the front suspension 36 can be received by the entire front side member 14. Therefore, the respective portions can be restrained from being displaced, and the rigidity thereof can be enhanced. Thus, it is possible to contribute toward reducing road noise during the running of the vehicle and enhancing the running stability of the vehicle. Moreover, while securing the rigidity during normal running by the suspension tower 10, the region of the front side member 14 that is located in front of the suspension tower 10 with respect to the vehicle can be constituted to be suited for absorption of collision energy. In this manner, the roles can be divided. Therefore, it is possible to contribute toward optimizing the performance for each of the roles and enhancing the degree of freedom in designing. Besides, in comparison with a configuration in which one or a plurality of combination portions are provided between a suspension tower and a front side member, the number of parts is smaller. Therefore, it is possible to contribute toward enhancing the mass efficiency.

Besides, in the present embodiment of the invention, when a bending load outward in the vehicle width direction is applied to the front side member 14 due to, for example, an offset collision of the vehicle, a tensile load is applied to the vehicle-width-direction inner portion 14B of the front side member 14, and a compressive load is applied to the vehicle-width-direction outer portion 14A. Part of this vehicle-width-direction outer portion 14A is constituted by the side member constituting portion 32 of the suspension tower 10, which is a casting made of a light metal. In general, however, plastic materials such as castings are higher in compressive strength than in tensile strength. Therefore, the region of the front side member 14 to which a compressive load is applied as described above is constituted by the side member constituting portion 32 as a casting, so the characteristics of the material can be taken advantage of, and the front side member 14 can be more efficiently utilized as a collision member.

Furthermore, in the present embodiment of the invention, the side member constituting portion 32 of the suspension tower 10 is provided with the plurality of the ribs 90 that extend into the closed cross-sectional shape of the front side member 14, in the region where the position in the vehicle front-rear direction overlaps with the suspension tower body portion 28. These ribs 90 reinforce the closed cross-sectional shape of the front side member 14, so the rigidity of the aforementioned closed cross-sectional shape in response to the load transmitted from the front suspension 36 to the front side member 14 can be enhanced. As a result, the effect of efficiently distributing the load from the front suspension 36 to the front side member 14 can be enhanced. Thus, it is possible to further contribute to the effect of enhancing the rigidity while restraining the respective portions from being displaced.

Besides, in the present embodiment of the invention, the sub-frame mounting portion 92 is provided between the pair of the ribs 90 that are adjacent to each other in the vehicle front-rear direction, in the region where the position of the side member constituting portion 32 in the vehicle front-rear direction overlaps with the suspension tower body portion 28. Thus, the sub-frame mounting portion 92 can be reinforced by the aforementioned pair of the ribs 90. As a result, the load from the front suspension 36, which is transmitted via the suspension tower body portion 28, can be efficiently distributed (assigned) to the sub-frame 96 as well via the pair of the ribs 90 and the sub-frame mounting portion 92. That is, the load can be efficiently received from the front suspension 36 through the use of the front side member 14 and the sub-frame 96. Therefore, it is possible to contribute toward effectively restraining the respective portions from being displaced and further enhancing the rigidity. Besides, it is also possible to contribute toward enhancing the mounting rigidity of the sub-frame 96 with respect to the front side member 14. Moreover, in the present embodiment of the invention, the sub-frame mounting portion 92 is formed integrally with the aforementioned pair of the ribs 90, so the aforementioned effect can be enhanced.

Furthermore, in the present embodiment of the invention, a surface of the frontmost rib 90 is provided on the same plane as the front wall 40 of the suspension tower body portion 28, and a surface of the second-from-front rib 90 is provided on the same plane as the front rib-like wall 56. Besides, a surface of the third-from-front rib 90 is provided on the same plane as the rear rib-like wall 58, and the rearmost rib 90 is provided on the same plane as the rear wall 42. Therefore, the load received from the front suspension 36 by the suspension tower body portion 28 can be linearly transmitted to the ribs 90 of the side member constituting portion 32 via the front wall 40, the rear wall 42, and the rib-like walls 56 and 58. Thus, it is possible to further contribute toward efficiently transmitting the load from the front suspension 36 to the front side member 14.

Besides, in the present embodiment of the invention, the lower arm coupling portion 34 to which the lower arm 63 is coupled is formed integrally with the suspension tower body portion 28 and the side member constituting portion 32 (part of the closed cross-sectional shape of the front side member 14). Therefore, in comparison with a case where the lower arm coupling portion 34 is formed separately from the suspension tower body portion 28 and the front side member 14, it is possible to contribute toward more efficiently transmitting the load from the front suspension 36 to the front side member 14.

Moreover, in the present embodiment of the invention, the front wall 102 of the lower arm coupling portion 34 is provided on the same plane as the front rib-like wall 56 of the suspension tower body portion 28 and a surface of the second-from-front rib 90 of the side member constituting portion 32. Besides, the rear wall 104 of the lower arm coupling portion 34 is provided on the same plane as a surface of the rear rib-like wall 58 of the suspension tower body portion 28 and the third-from-front rib 90 of the side member constituting portion 32. Thus, the load from the lower arm 63 can be efficiently transmitted to the side member constituting portion 32, so it is possible to further contribute to the effect of enhancing the efficiency of transmitting the load to the front side member 14.

Besides, in the present embodiment of the invention, the shock absorber, the upper arm 62, and the lower arm 63 of the front suspension 36 are fixed or coupled to the suspension tower 10 as an integrally formed product. Thus, it is possible to contribute toward enhancing the accuracy in alignment of the front suspension 36.

That is, with the vehicle body structure described in the section of the related art, the number of parts interposed between the suspension tower (the damper housing) to which the spring-fitted shock absorber and the upper arm are mounted and the suspension member to which the lower arm is mounted is increased. Therefore, it is difficult to secure the accuracy in assembling between the suspension tower and the suspension member. As a result, the suspension is considered to be incapable of sufficiently exerting its original performance.

In contrast, according to the present embodiment of the invention, the upper arm coupling portion 64 and the lower arm coupling portion 34 are integrated with the suspension tower 10. Thus, the relative tolerance between the upper arm 62 and the lower arm 63 can be set within a single part, so the accuracy in assembling the upper arm 62 and the lower arm 63 with each other can be enhanced. As a result, it is possible to contribute toward sufficiently exerting the original performance of the suspension.

Besides, in the present embodiment of the invention, the suspension tower 10 has the continuous wall 110 that extends through the suspension tower body portion 28, the side member constituting portion 32, and the lower arm coupling portion 34. Therefore, the load received from the front suspension 36 by the suspension tower body portion 28 and the lower arm coupling portion 34 can be efficiently transmitted to the side member constituting portion 32 (i.e., the front side member 14) via the aforementioned continuous wall 110. Thus, it is possible to contribute toward further enhancing the efficiency of transmitting the load to the front side member 14.

Incidentally, the aforementioned first embodiment of the invention adopts the configuration in which the four ribs 90 are provided on the side member constituting portion 32 of the suspension tower 10, but the invention is not limited thereto. The number of ribs 90 can be appropriately changed.

Besides, the aforementioned first embodiment of the invention adopts the configuration in which the suspension tower 10 is equipped with the lower arm coupling portion 34, but the invention is not limited thereto. It is also acceptable to adopt a configuration in which the lower arm coupling portion 34 is omitted. In that case as well, there are not as many combination portions as in the related art between the suspension tower body portion 28 and the side member constituting portion 32 (the front side member 14). Therefore, it is possible to contribute toward enhancing the rigidity, enhancing the mass efficiency, enhancing the accuracy in alignment etc. as described above.

Besides, in the aforementioned first embodiment of the invention, the case where part of the vehicle-width-direction outer portion 14A of the front side member 14 is constituted by the side member constituting portion 32 of the suspension tower 10 has been described, but the invention is not limited thereto. For example, part of the vehicle-width-direction inner portion of the front side member may be constituted by the side member constituting portion of the suspension tower.

Next, another embodiment of the invention will be described. Incidentally, the configuration and operation that are basically the same as in the first embodiment of the invention will not be described, with the same reference symbols as in the first embodiment of the invention assigned thereto.

Second Embodiment

Figure 5:
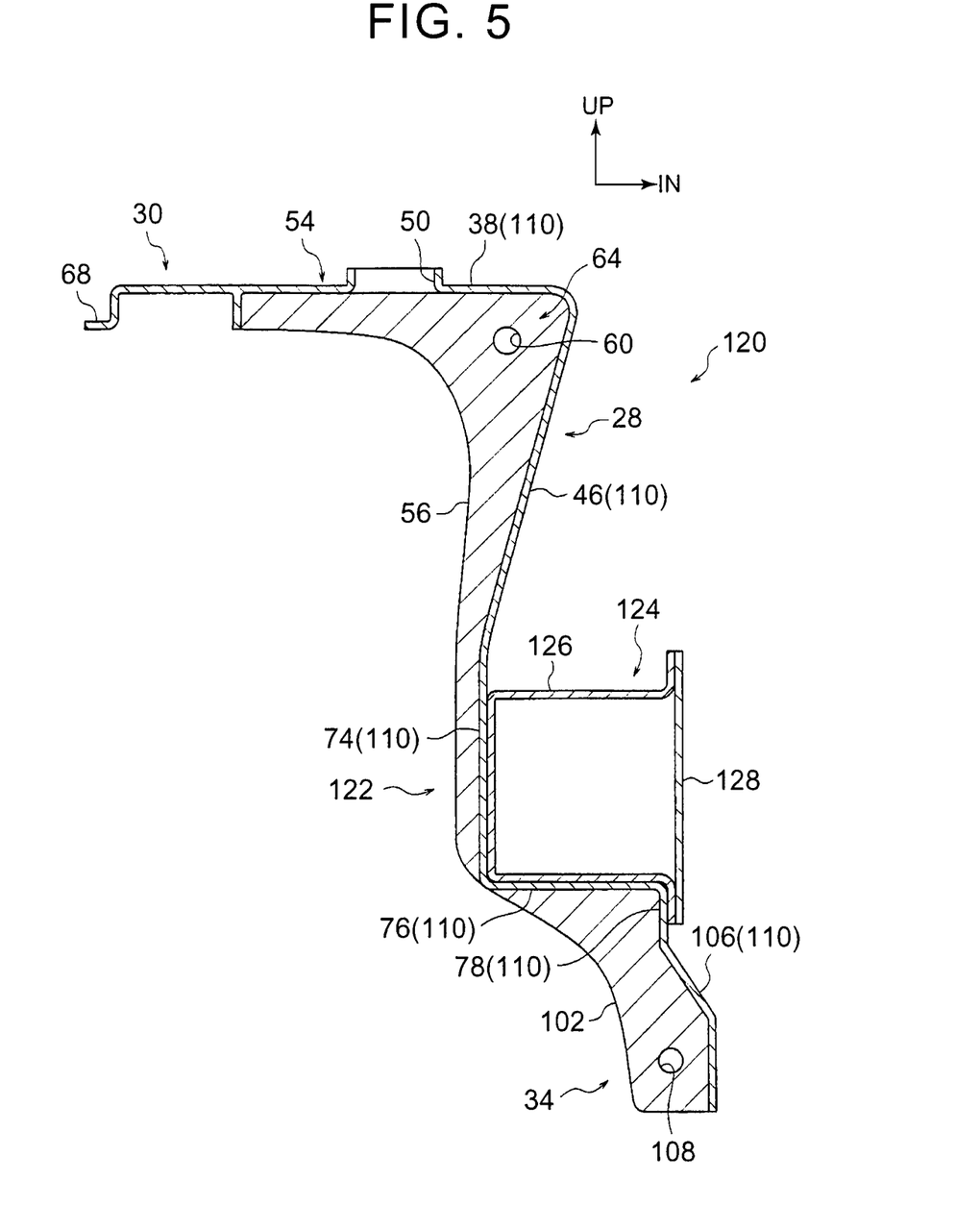
FIG. 5 is a cross-sectional view showing the partial configuration of a vehicle front structure according to the second embodiment of the invention in such a manner as to correspond to FIG. 3.

FIG. 5 is a cross-sectional view showing the partial configuration of a vehicle front structure according to the second embodiment of the invention in such a manner as to correspond to FIG. 3. A suspension tower 120 according to this embodiment of the invention is close in configuration to the suspension tower 10 according to the first embodiment of the invention, but is not equipped with the side member constituting portion 32 according to the first embodiment of the invention. Instead, this suspension tower 120 is equipped with a side member combining portion 122. This side member combining portion 122 is equipped with the vehicle-width-direction outer wall 74 and the lower wall 76 as is the case with the side member constituting portion 32 according to the first embodiment of the invention, but the plurality of the ribs 90 and the sub-frame mounting portion 92 are omitted.

Besides, in this embodiment of the invention, a front side member 124 is formed of an outer panel 126 and an inner panel 128 as press-molded products made from steel plates. This front side member 124 is combined with (fixed to) the vehicle-width-direction outer wall 74 and the lower wall 76 of the side member combining portion 122 through the use of means such as fastening by bolts or the like. That is, in this embodiment of the invention, unlike the first embodiment of the invention, part of a closed cross-sectional member of the front side member 124 is not constituted by part of the suspension tower 120. Incidentally, a bulk (not shown) is fixed in a closed cross-section of the aforementioned front side member 124, in a overlapping region where the position in the vehicle front-rear direction overlaps with the suspension tower 120. Configurational details other than those mentioned above are the same as in the first embodiment of the invention.

In this embodiment of the invention, the side member combining portion 122 that is formed integrally with the suspension tower body portion 28 and the lower arm coupling portion 34 is directly combined with the front side member 124 without the intermediary of a bracket or the like. Thus, the number of combination portions between the suspension tower body portion 28 and the lower arm coupling portion 34 on the one hand and the front side member 124 on the other hand can be reduced. Therefore, it is possible to contribute toward efficiently transmitting the load from the front suspension 36 to the front side member 124.

Besides, in this embodiment of the invention, the suspension tower body portion 28 provided with the upper arm coupling portion 64 and the lower arm coupling portion 34 are linked with each other by the continuous wall 110. Thus, it is possible to further contribute toward efficiently transmitting the load from the front suspension 36 to the front side member 124 via the suspension tower body portion 28 and the lower arm coupling portion 34. Besides, the suspension tower body portion 28 that is provided with the absorber mounting portion 54 and the upper arm coupling portion 64, and the lower arm coupling portion 34 are formed integrally with each other. Therefore, it is possible to contribute toward enhancing the accuracy in alignment of the front suspension 36.

Incidentally, the aforementioned second embodiment of the invention adopts the configuration in which the side member combining portion 122 that is integrally provided between the suspension tower body portion 28 and the lower arm coupling portion 34 is provided outside the front side member 124 with respect to the vehicle, but the invention is not limited thereto. For example, it is also acceptable to adopt a configuration in which the side member combining portion that is integrally provided between the suspension tower body portion and the lower arm coupling portion is combined with the outer panel (the vehicle-width-direction outer portion) and the inner panel (the vehicle-width-direction inner portion) of the front side member while being sandwiched therebetween.

The invention has been described above citing the two embodiments thereof. However, the invention can be carried out after being modified in various manners without departing from the gist thereof. Besides, the scope of rights of the invention is obviously not limited to the aforementioned respective embodiments thereof.

The invention claimed is:

1. A suspension tower comprising:
a suspension tower body portion being provided between a front side member of a vehicle and an apron upper member of the vehicle, the suspension tower body portion being fixed to an upper end portion of a shock absorber of a front suspension, and the suspension tower body portion being coupled to an upper arm of the front suspension; and
a side member constituting portion being formed integrally with the suspension tower body portion, the side member constituting portion defining part of a closed cross-sectional shape of the front side member; wherein
the front side member is formed by combining a vehicle-width-direction outer portion of the front side member and a vehicle-width-direction inner portion of the front side member with each other,
the suspension tower body portion and the side member constituting portion are castings,
the side member constituting portion defines part of the vehicle-width-direction outer portion of the front side member,
the side member constituting portion is provided with a rib that extends into the closed cross-sectional shape,
the side member constituting portion has an overlapping region where a position of the side member constituting portion in a vehicle front-rear direction and a position of the suspension tower body portion in the vehicle front-rear direction overlap with each other as viewed in the vehicle width direction, and
the overlapping region of the side member constituting portion is provided with the rib.

2. The suspension tower according to claim 1, wherein
the side member constituting portion is provided with a pair of the ribs that are adjacent to each other in the vehicle front-rear direction,
a sub-frame mounting portion is provided between the pair of the ribs,
the sub-frame mounting portion is mounted with a sub-frame, and
the sub-frame is disposed downward in a vehicle up and down direction with respect to the front side member.

3. The suspension tower according to claim 1, wherein
a surface of the rib is provided on a same plane as a surface of one wall portion with which the suspension tower body portion is equipped.

4. The suspension tower according to claim 1, further comprising:
a lower arm coupling portion being formed integrally with the suspension tower body portion and the side member constituting portion, wherein
a lower arm of the front suspension is coupled to the lower arm coupling portion.

5. The suspension tower according to claim 1, wherein
a continuous wall extends through the suspension tower body portion and the side member constituting portion.

6. A vehicle front structure comprising:
the suspension tower according to claim 1, the suspension tower including the front side member, the apron upper member and the front suspension, wherein
the front side member, the apron upper member, the front suspension, and the suspension tower are provided at both right and left side portions of a vehicle front portion respectively.

\* \* \* \* \*